Nov. 8, 1966    E. H. KUEHN    3,284,124
BATTERY CARRYING DEVICE
Filed May 27, 1964
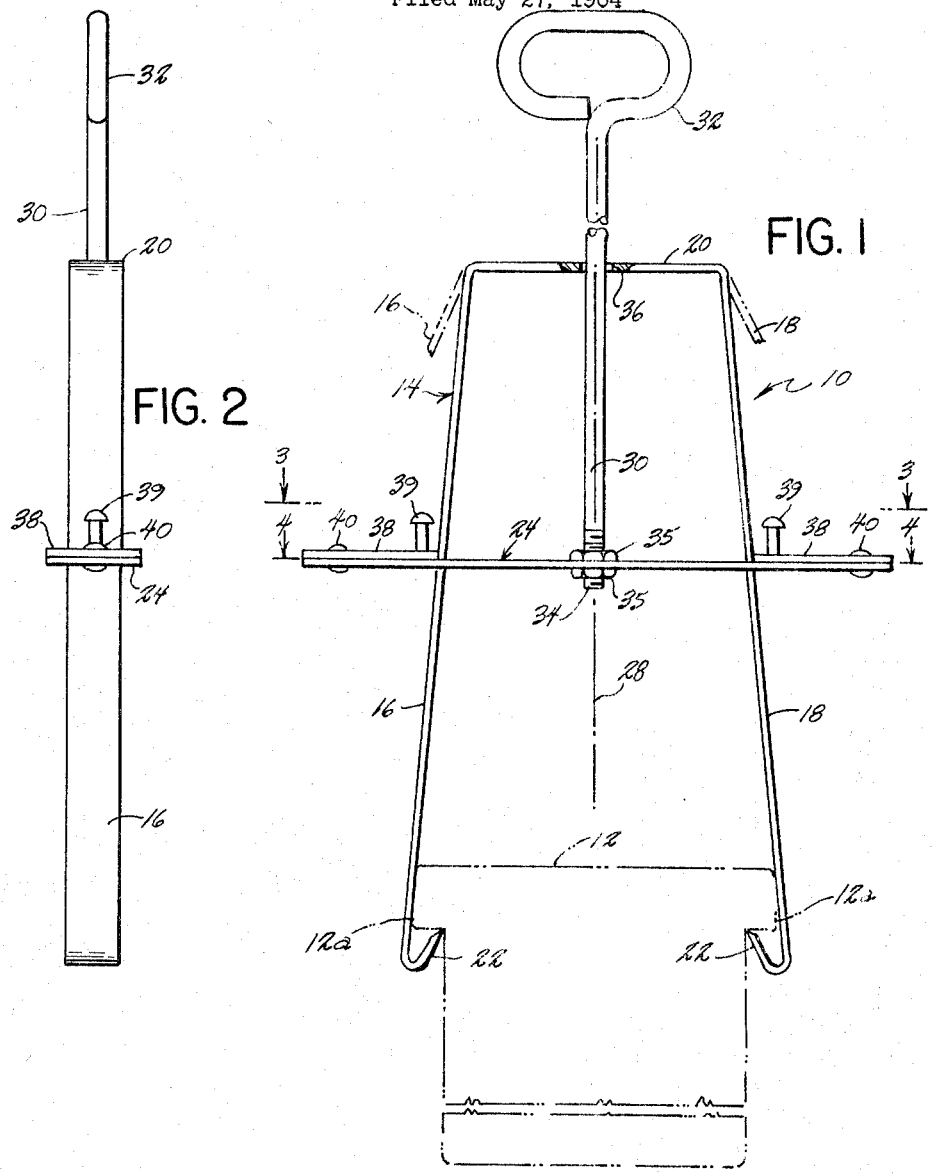
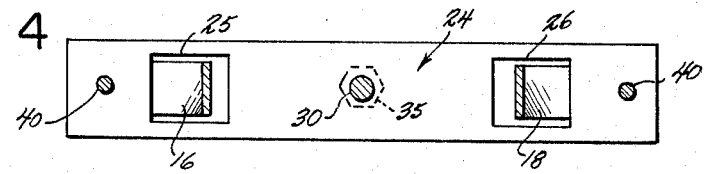
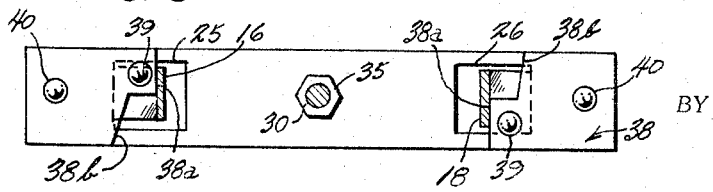
INVENTOR.
EMIL H. KUEHN
BY
Mark W. Gehan
ATTORNEY

3,284,124
BATTERY CARRYING DEVICE
Emil H. Kuehn, Mazeppa Township,
Wabasha County, Minn.
Filed May 27, 1964, Ser. No. 370,521
4 Claims. (Cl. 294—31)

The present invention relates generally to materials handling apparatus and more specifically to a carrying device for storage batteries.

Storage batteries are used extensively in the automotive field and it is often necessary to move the same from one place to another without coming in contact with the acid contained therein. Such acid can cause burns on the human body and can eat its way into certain other materials.

In certain battery carrying devices presently known in the art, the battery is supported and carried by the battery post or terminal. Such posts are probably the weakest part of the battery since they are often soldered into the battery case. Also such devices frequently slip free of the battery posts resulting in subsequent breakage of the battery.

Thus it is one object of the invention to provide a battery carrying device which will support the battery by its case and which will maintain the same in a dead or locked type grip during transportation.

Another object of the invention is to provide a battery carrying device which allows the battery to be transported or handled without the same actually coming in contact with the human body.

Yet another object of the invention is to provide a battery carrying device which is easily engaged and disengaged from a storage battery during the handling of the same.

Other objects and advantages will become apparent in the following specification and appended drawings in which;

FIGURE 1 is a front elevational view of the preferred embodiment of the invention, FIGURE 1 is a side elevational view of the device of FIGURE 1, FIGURE 3 is a sectional view taken along line 3—3 of FIGURE 1, and FIGURE 4 is a sectional view of the device of FIGURE 1 as taken generally along and in the direction of line 4—4 of that figure.

Referring now to the details of the invention with specific reference to FIGURE 1 of the drawings. The battery carrying device is indicated generally by the numeral 10 and is designed to be superimposed over a battery 12 and engages the same in the manner hereinafter described.

The battery carrying device 10 includes a clevis-shaped carrier strap 14 which is made of metal or other suitable material and which includes a pair of relatively flexible, depending carrier arms 16 and 18. The carrier arms 16 and 18 are integral with the top 20 of the carrier strap 14 and each arm includes at its lower end an inwardly and upwardly projecting carrier hook 22.

Positioned below the top 20 of the carrier strap 14 is an arm engaging bar 24 which lies substantially parallel with respect to the top 20. The arm engaging bar 24 includes a pair of rectangular apertures 25 and 26 through which arms 16 and 18 project in their path downward. The latter can be seen more specifically in FIGURE 4.

Pivotally mounted above the bar 24 by rivets 40 are a pair of cams 38. Each cam 38 is substantially identical in shape and each overlies a portion of its respective aperture 25 or 26. A finger pin 39 is provided on each of the cams 38 and by virtue of the same the cams can be pivoted about rivets 40 to determine the spacing between carrier arms 16 and 18. The latter movement causes camming surfaces 38a and 38b to be selectively moved into position against the sides of arms 16 and 18. In this manner the carrying device 10 is adjustable for carrying batteries having various widths.

The carrier strap 14 and the bar 24 are substantially symmetrical about a central vertical axis 28 as seen in FIGURE 1 and a support shaft 30 with a handle 32 extends along said axis and is attached to the bar 24 by its threaded end 34 and nuts 35.

The support shaft 30 extends through a central clearance hole or aperture 36 in the top 20 of the carrier strap 24 and can be manually actuated to move the shaft 30 and hence the bar 24 axially of the strap 24.

In actual use the device 10 is employed as shown in FIGURE 1 with arms 16 and 18 disposed on opposite sides of the battery 12. The handle 32 is first raised upwardly along axis 28 and by virtue of the bar 24 causes the carrier arms to be cammed outwardly so that hook 22 clears the shoulders 12a of the battery 12. The handle 32 is then pushed downwardly causing cams 38 on bar 24 to move arms 16 and 18 inwardly against the sides of shoulders 12a. The hooks 22 are underneath the shoulders 12a and by placing the fingers of one hand under the top 20 the battery can be lifted and carried to a desired location. The arms 16 and 18 of course are frictionally engaged with cams 38 and such engagements prevents the bar 24 from sliding upward. Thus a dead type grip is provided which retains the arms 16 and 18 against outward movement while the battery is being handled. To release the battery 12 the handle 32 is raised upwardly allowing arms 16 and 18 to move outwardly.

Thus in the above specification I have presented a detailed description of my invention together with some of the ways by which it can be practiced. It is not intended to limit my invention except to the extent of the appended claims.

Now therefore I claim:

1. In a device for carrying storage batteries the combination comprising, a carrier strap including a substantially horizontal top provided with a centralized aperture therein and a pair of flexible carrier arms extending downwardly from said top obliquely of the axis of said aperture, said carrier arms being oppositely disposed with respect to each other and each provided at its end opposite said top with a carrier hook for engaging the underside of the uppermost peripheral flange of a storage battery, an arm engaging strap below said aperture, a support shaft attached at its one end to said arm engaging strap and provided at its opposite end with a handle, said shaft and said strap moveable along said axis and a first and a second cam means pivotal on said strap and cooperating with said arms to engage and disengage said support hooks from said storage battery.

2. The device of claim 1 in which said engaging strap includes a first and a second aperture one for each of said arms and wherein a camming means is pivotally mounted on said strap adjacent said apertures and cooperates with each of said apertures to cause movement of its respective arm member.

3. The device of claim 2 wherein said camming means includes means pivotal on said arm engaging means for determining the extent of movement of said arms to facilitate handling of storage batteries of various dimensions.

4. The device of claim 2 in which each said carrier hook includes a sharp edge for engaging the underside of the uppermost peripheral edge of a storage battery and wherein the innermost vertical face of said hook lies substantially parallel to the side of a storage battery when said hook is in a battery carrying position.

References Cited by the Examiner

UNITED STATES PATENTS

| 659,678 | 10/1900 | Kindschuh | 294—33 |
| 2,792,253 | 5/1957 | Bliss | 294—100 |
| 2,794,666 | 6/1957 | Bishman | 294—16 |
| 2,794,667 | 6/1957 | Bissitt | 294—100 X |

FOREIGN PATENTS

| 201,334 | 8/1923 | Great Britain. |

GERALD M. FORLENZA, *Primary Examiner.*

G. F. ABRAHAM, *Assistant Examiner.*